US009977472B2

(12) United States Patent
Huhtala et al.

(10) Patent No.: US 9,977,472 B2
(45) Date of Patent: May 22, 2018

(54) METHOD AND APPARATUS FOR DISPLAYING RELATIVE MOTION OF OBJECTS ON GRAPHICAL USER INTERFACE

(75) Inventors: Jussi Taavetti Huhtala, Oulu (FI); Pertti Juhani Huuskonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 1496 days.

(21) Appl. No.: 12/727,690

(22) Filed: Mar. 19, 2010

(65) Prior Publication Data

US 2011/0231797 A1    Sep. 22, 2011

(51) Int. Cl.
G06F 1/16     (2006.01)
G06F 3/01     (2006.01)
G06F 3/0481   (2013.01)
H04M 1/725    (2006.01)

(52) U.S. Cl.
CPC .......... *G06F 1/1694* (2013.01); *G06F 1/1626* (2013.01); *G06F 3/017* (2013.01); *G06F 3/0481* (2013.01); *G06F 2200/1637* (2013.01); *H04M 1/72544* (2013.01); *H04M 2250/12* (2013.01)

(58) Field of Classification Search
CPC .. G06F 3/0482; G06F 3/0481; G06F 3/04817; G06F 2200/1637; G06F 3/0346
USPC ................... 715/811, 835; 345/156
See application file for complete search history.

(56) References Cited

U.S. PATENT DOCUMENTS

| | | | |
|---|---|---|---|
| 5,568,164 A * | 10/1996 | Ogawa | G06F 3/038 345/157 |
| 5,806,071 A | 9/1998 | Balderrama et al. | |
| 6,785,667 B2 * | 8/2004 | Orbanes et al. | |
| 6,834,249 B2 | 12/2004 | Orchard | |
| 7,581,184 B2 * | 8/2009 | Dubinko et al. | 715/719 |
| 7,716,600 B2 | 5/2010 | Sawano | |
| 8,453,055 B2 * | 5/2013 | Oh | 715/702 |
| 8,645,871 B2 * | 2/2014 | Fong et al. | 715/863 |
| 2002/0093539 A1 | 7/2002 | Os et al. | |
| 2004/0070593 A1 * | 4/2004 | Neely et al. | 345/716 |
| 2006/0004692 A1 * | 1/2006 | Kaasten et al. | 707/1 |
| 2006/0075355 A1 * | 4/2006 | Shiono | G06F 3/04812 715/778 |

(Continued)

FOREIGN PATENT DOCUMENTS

EP    1 241 616 A2    9/2002
EP    1 291 047 A2    3/2003

(Continued)

OTHER PUBLICATIONS

International Search Report for corresponding PCT Application No. PCT/FI2011/050054, dated May 9, 2011, pp. 1-5.

(Continued)

*Primary Examiner* — Phuong Nguyen
(74) *Attorney, Agent, or Firm* — Ditthavong & Steiner, P.C.

(57) ABSTRACT

A method including causing, at least in part, display of objects on a graphical user interface, where each of the objects corresponds to data or an application accessible via the graphical user interface. The method further includes causing, at least in part, display of the objects in motion on the graphical user interface based on user input and based on respective relative mass values associated with the objects.

17 Claims, 9 Drawing Sheets

(56) References Cited

U.S. PATENT DOCUMENTS

| | | |
|---|---|---|
| 2006/0107213 A1 | 5/2006 | Kumar et al. |
| 2006/0164382 A1 | 7/2006 | Kulas et al. |
| 2006/0277500 A1 | 12/2006 | Sawano |
| 2007/0085829 A1 | 4/2007 | Lin |
| 2007/0124697 A1 | 5/2007 | Dongelmans |
| 2007/0155461 A1 | 7/2007 | Loewenstein et al. |
| 2007/0178974 A1* | 8/2007 | Masuyama et al. ............ 463/43 |
| 2007/0283276 A1* | 12/2007 | Neely et al. .................. 715/747 |
| 2007/0283290 A1* | 12/2007 | Dubinko et al. .............. 715/784 |
| 2008/0001924 A1 | 1/2008 | de los Reyes et al. |
| 2008/0074384 A1 | 3/2008 | Orr et al. |
| 2008/0186332 A1 | 8/2008 | Kim et al. |
| 2008/0229255 A1 | 9/2008 | Linjama et al. |
| 2009/0088204 A1* | 4/2009 | Culbert et al. ............. 455/556.1 |
| 2009/0122018 A1* | 5/2009 | Vymenets et al. ............ 345/173 |
| 2009/0143877 A1* | 6/2009 | Panje ............................. 700/83 |
| 2009/0201270 A1* | 8/2009 | Pikkujamsa et al. ......... 345/184 |
| 2009/0235206 A1 | 9/2009 | Hsu |
| 2010/0095219 A1 | 4/2010 | Stachowiak et al. |
| 2010/0306650 A1 | 12/2010 | Oh et al. |
| 2011/0078109 A1 | 3/2011 | Griggs et al. |
| 2011/0090310 A1* | 4/2011 | Lee et al. ....................... 348/43 |
| 2011/0093092 A1* | 4/2011 | Choi et al. ..................... 700/11 |

FOREIGN PATENT DOCUMENTS

| | | | |
|---|---|---|---|
| EP | 1 780 633 A2 | 5/2007 | |
| EP | 1 912 109 A1 | 4/2008 | |
| EP | 2 090 975 A1 | 8/2009 | |
| EP | 2 207 077 A1 | 7/2010 | |
| EP | 2204702 A1 * | 7/2010 | .......... G04G 9/0064 |
| KR | 20100127382 A | 12/2010 | |
| WO | WO 01/27735 A1 | 4/2001 | |
| WO | WO 0127735 A1 * | 4/2001 | ............. G06F 3/033 |

OTHER PUBLICATIONS

Written Opinion of the International Searching Authority for corresponding PCT Application No. PCT/FI2011/050054, dated May 9, 2011, pp. 1-10.

Hot Windows Mobile 7 Insight, Jan. 7, 2008. Accessed: May 20, 2010, http://www.gsmarena.com/hot_windows_mobile_7_insight-news-399.php#, pp. 1-3.

Tags, Accessed: May 20, 2010, http://www.flickr.com/photos/tags, pp. 1-2.

Office Action for related U.S. Appl. No. 12/651,071 dated Aug. 23, 2012, pp. 1-27.

Korean Office Action with English Language Summary for corresponding Patent Application No. 10-2012-7027190 dated Oct. 30, 2013, 6 pages.

\* cited by examiner

METHOD AND APPARATUS FOR DISPLAYING RELATIVE MOTION OF OBJECTS ON GRAPHICAL USER INTERFACE

BACKGROUND

Service providers and device manufacturers are continually challenged to deliver value and convenience to consumers by, for example, providing compelling services and vast array of media and products. Service providers can provide various user interface applications for use on user equipment that enhance the user's interface experience with the user equipment and utilization of the various products and services offered by the service provider. In addition to being easy to use and simple, the modern user interface is essential part of entertainment and media consumption, thus it should also provide a playful and enjoyable experience. Strict effectiveness is not the only factor in measuring a good user interface. Combining an easy-to-use and effective user interface with playful and entertaining aspects is a challenging task and there are no obvious and straightforward solutions.

SOME EXAMPLE EMBODIMENTS

Therefore, there is a need for an approach for displaying relative motion of objects on a graphical user interface. It will combine a clean and simple interface with playful and entertaining factors.

According to one embodiment, a method comprises causing, at least in part, display of objects on a graphical user interface, wherein each of the objects corresponds to data or an application accessible via the graphical user interface. The method further comprises causing, at least in part, display of the objects in motion on the graphical user interface based on user input and based on respective relative mass values associated with the objects.

According to another embodiment, an apparatus comprising at least one processor, and at least one memory including computer program code, the at least one memory and the computer program code configured to, with the at least one processor, cause the apparatus to perform at least the following: cause, at least in part, display of objects on a graphical user interface, wherein each of the objects corresponds to data or an application accessible via the graphical user interface; and cause, at least in part, display of the objects in motion on the graphical user interface based on user input and based on respective relative mass values associated with the objects.

According to another embodiment, a computer-readable storage medium carrying one or more sequences of one or more instructions which, when executed by one or more processors, cause an apparatus to at least perform the following steps: causing, at least in part, display of objects on a graphical user interface, wherein each of the objects corresponds to data or an application accessible via the graphical user interface; and causing, at least in part, display of the objects in motion on the graphical user interface based on user input and based on respective relative mass values associated with the objects.

According to another embodiment, an apparatus comprises means for causing, at least in part, display of objects on a graphical user interface, wherein each of the objects corresponds to data or an application accessible via the graphical user interface. The apparatus further comprises means for causing, at least in part, display of the objects in motion on the graphical user interface based on user input and based on respective relative mass values associated with the objects.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for displaying relative motion of objects on a graphical user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to the use thereof on mobile devices such as cellular telephones, it is contemplated that the approach described herein may be used with any other type of portable or handheld user equipment and/or in conjunction with the use of or on a server such as a service provider server or any other type of server.

Figure 1:
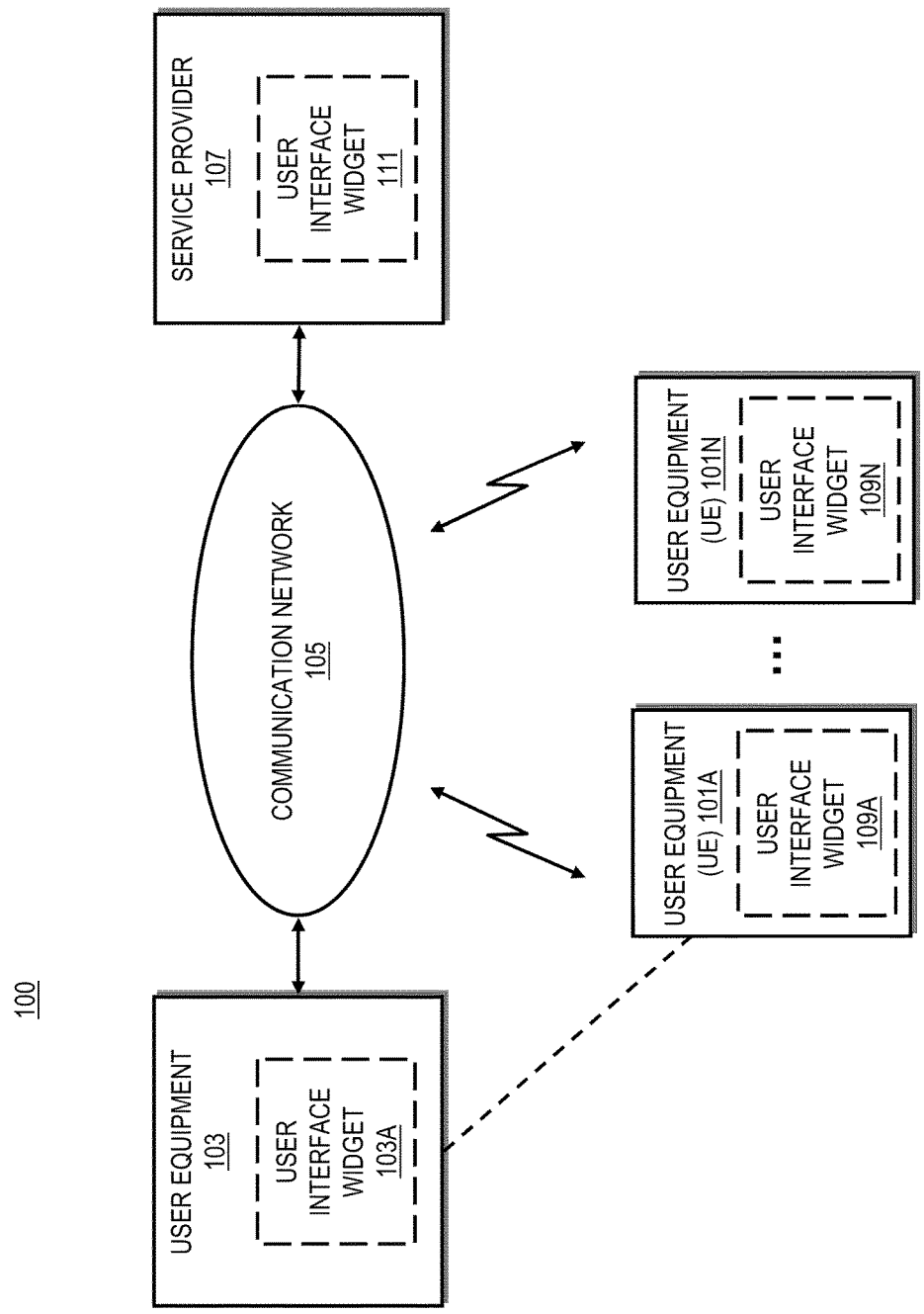
FIG. 1 is a diagram of a system capable of displaying relative motion of objects on a graphical user interface, according to one embodiment.

FIG. 1 is a diagram of a system capable of displaying relative motion of objects on a graphical user interface, according to an embodiment. As shown in FIG. 1, the system 100 comprises user equipment (UE) 101A . . . 101N and 103 having connectivity to a communication network 105. Also a service provider server 107 is provided that is also connected to communication network 105. In this figure, UE 101A . . . UE101N, UE 103, and service provider 107 are each shown as including a user interface widget 109A . . . 109N, 103A, and 111, respectively; however, it is contemplated that such a widget need not be provided in each but rather it could alternatively be provided in one or any combination of more than one such apparatuses. By way of illustration and not limitation, UE 101A could be provided as a mobile device having user interface widget 109A, and such UE 101A could provide the user interface displays described herein without the need for any other user interface widget. Thus, if a user is utilizing the user interface display on UE 101A, the UE 101A can utilize the user interface widget 109A in order to provide such a display, or the user interface widget 103A or the user interface widget 111, or a combination thereof depending on whether the widget is being run locally or remotely. Also, by way of illustration and not limitation, UE 103 is shown as being connected to UE 101A by a dashed line, which can be any form of wireless or wired connection, such as, for example, when a mobile device is connected with another device for syncing, etc.

By way of example, the communication network 105 of system 100 includes one or more networks such as a data network (not shown), a wireless network (not shown), a telephony network (not shown), short range wireless network (not shown), broadcast network (not shown) or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), wireless LAN (WLAN), Bluetooth® network, Ultra Wide Band (UWB) network, and the like.

The UEs 101A . . . 101N and 103A is any type of mobile terminal, fixed terminal, or portable terminal including a mobile handset, station, unit, device, multimedia computer, multimedia tablet, Internet node, communicator, communication device, desktop computer, laptop computer, Personal Digital Assistants (PDAs), audio/video player, digital still/video camera, game device, analog/digital television broadcast receiver, analog/digital radio broadcast receiver, positioning device, electronic book device, or any combination thereof. It is also contemplated that the UEs 101A . . . 101N can support any type of interface to the user (such as "wearable" circuitry, etc.).

By way of example, the UEs 101A . . . 101N, 103, and service provider 107 can communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

One or more embodiments described herein are related to multimodal user interface (UI) concepts and graphical UIs, and can act as a replacement for current UIs and can replace the entire UI framework.

Typically GUIs are intended to simplify navigation and make it easier to find things and manipulate them. The desktop metaphor used in personal computers, for example, is a common example of GUIs. For smaller screens, such as on mobile telephones, personal digitals assistants (PDAs), digital media players, etc., metaphors are slightly different such as, for example, an idle-screen, or an application view arrangement, etc. Even with these variations, they are based on the same basic principle as typical text menu based UIs, where a user has to actively navigate through various menus in order to find things, which means that the user has to know what he or she is after. However, if the user is not sure of what they are looking for, then it is difficult for the user to find what they are looking for in the various menus.

Accordingly, embodiments of the GUI described herein advantageously provide a new and unique way to present data and device functions (or applications) to the user. The GUI presents data and applications as "objects" that are presented on the display such that they shown intuitive motion of the objects in response to user input by way of user motion of the apparatus on which the GUI is displayed. The objects flow upon the GUI in a fluid manner in response to movement of the apparatus, and can return to the original starting position once motion has ceased. The objects are provided with a relative mass based on factors associated with that object, such as a relative importance of the object, such that the objects move intuitively based on such relative mass. Thus, for example, objects that are commonly used by the user could be easily distinguishable from their movement on the screen in response to the user shaking the apparatus. Accordingly, the user could quickly locate frequently used objects, and then select such objects in order to access the data or application associated therewith. The GUI provides a dynamic idle-screen type of interface, in which objects can flow in a virtual fluid environment on the screen in order to provide the user with an intuitive and entertaining interface.

Figure 2:
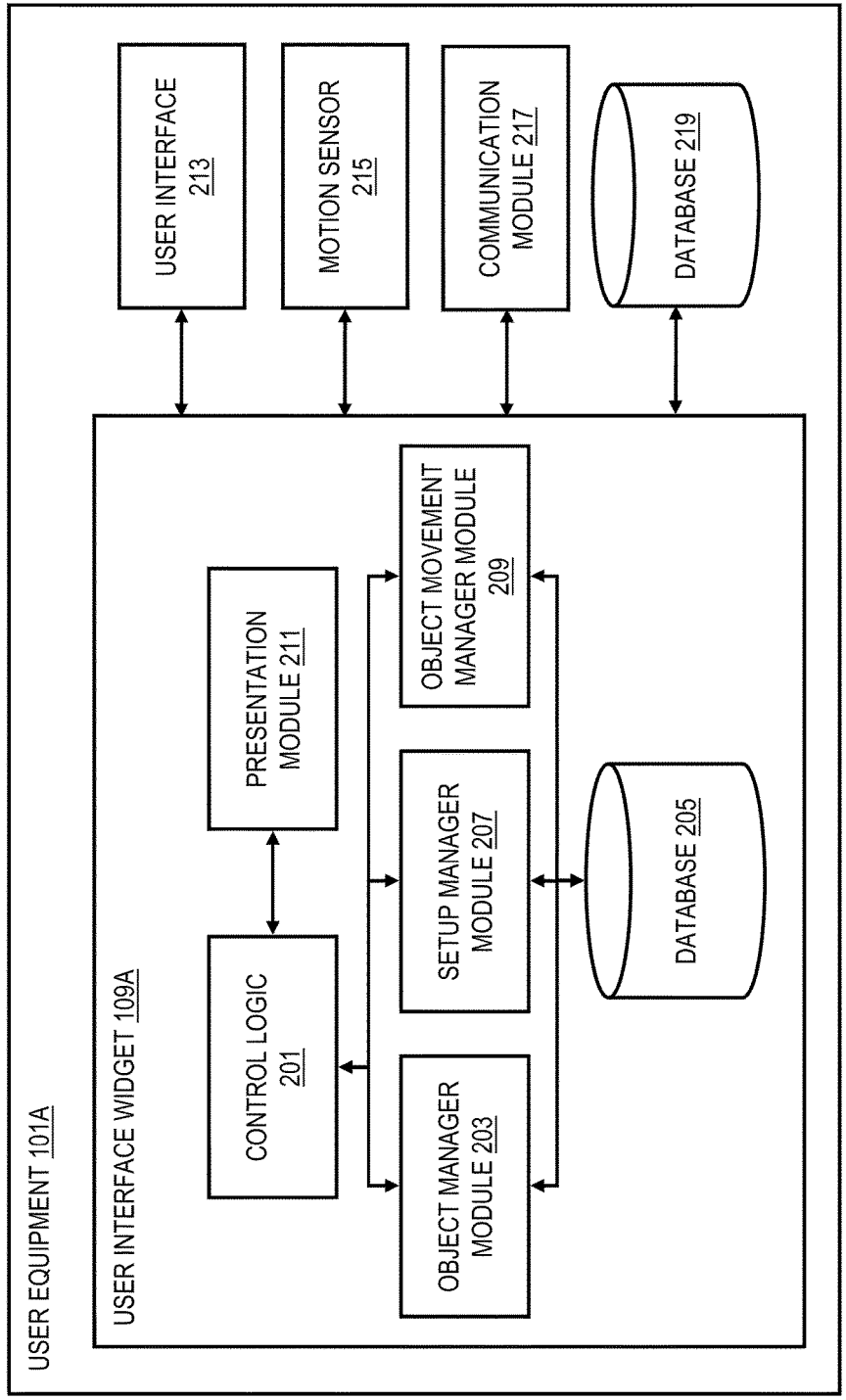
FIG. 2 is a diagram of the components of user equipment including a user interface widget, according to one embodiment.

FIG. 2 is a diagram of the components of user equipment including a user interface widget, according to one embodiment. By way of example, the user interface widget 109A includes a control logic 201 that controls the widget and graphical user interface (GUI), an object manager module 203, a database 205, a setup manager module 207, an object movement manager module 209, and a presentation module 211. The object manager module 203 can manage a list of the objects for the GUI and assign a relative mass value to each object, and store such information in the database 205. The object manager module 203 can monitor and update such relative mass values based on user actions, contextual data, or information provided from remote servers. The setup manager module 207 can manage any user settings that are defined by the user for the GUI and store such information in the database 205. The object movement manager module 209 can manage the movement of the objects based on inputs of the user, the relative mass values associated with the objects, a viscosity model used to create the virtual fluid environment of the GUI, and return spring function, and store such information in the database 205. The object movement manager module 209 can control the direction, distance, and speed of objects, the plane within which each object travels during movement, as well as other visual aspects of the motion of the objects, and can handle system configurations in light of user actions that are performed during operation of the GUI. The control logic 201 can also monitor various actions of the user, and control the operation of the GUI and interactions amongst the various components of the UE 101A.

The presentation module 211 can communicate with a display of a user interface 213 of the UE 101A to display the GUI. The UE 101A includes a motion sensor 215, such as an accelerometer, that can sense the movement of the UE 101A, and such information can be utilized as user input information for determining the movement of the objects. Additionally, the UE 101A includes a communication module 217 that allows the UI widget 109A to communicate with any remote device or server, if needed in order to present objects on the GUI, or to utilize data or applications associated with the objects. Also, the UE 101A includes a database 219 that can be used to store data and applications.

FIG. 2 depicts the user interface widget 109A provided in UE 101A in order to provide a GUI for objects corresponding to data and applications locally stored on the UE 101A or accessible remotely from service provider 107 or another server or UE. Also, the user interface widgets 103A and 111 in UE 103 and server provider 107, respectively, can have the same components as user interface widget 109A, and thus can perform similar functions. The user interface widget 111 can have the same components as user interface widget 103A, and thus can provide, for example, a web-based GUI to any UE connected thereto via the communication network 105. Furthermore, such user interface widgets (or one or more components thereof) can be provided at various devices/servers, which can then be used in conjunction with each other to provide the GUI functionalities described herein.

Figure 3A:
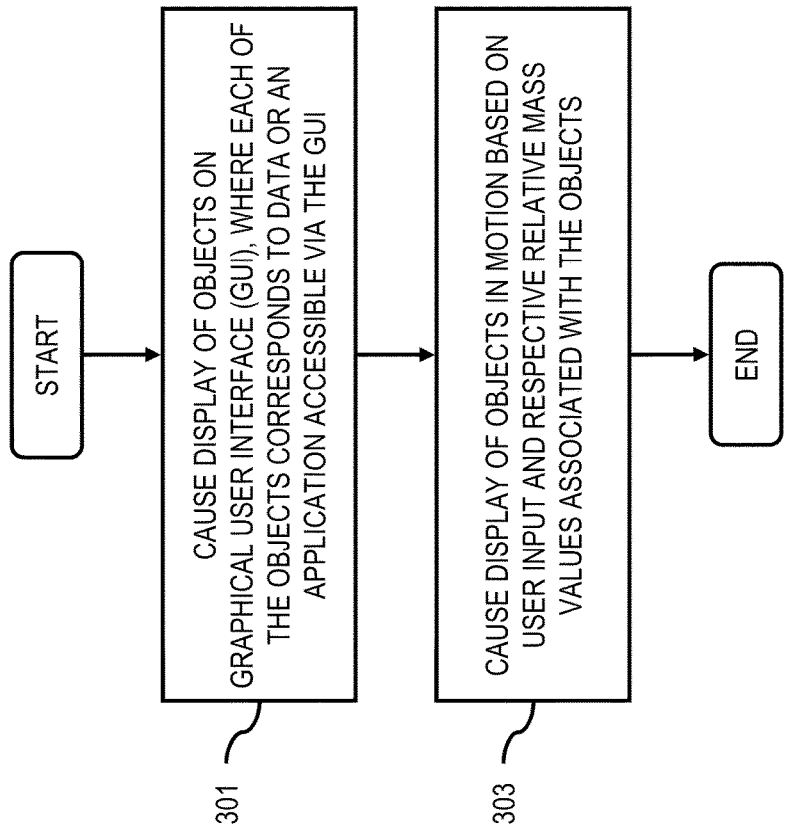
FIG. 3A is a flowchart of a process for displaying relative motion of objects on a graphical user interface, according to one embodiment.
Figure 3B:
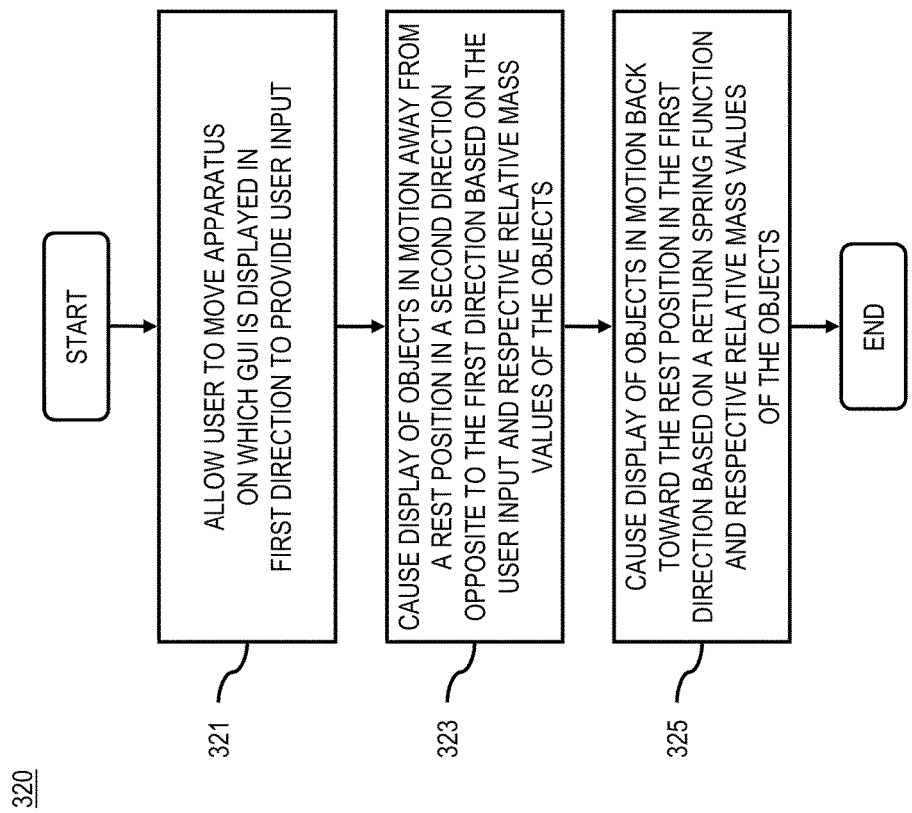
FIG. 3B is a flowchart of a process for displaying relative motion of objects on a graphical user interface using user input, relative mass values of the objects, and a return spring function, according to one embodiment.

FIG. 3A is a flowchart of a process 300 for displaying relative motion of objects on a graphical user interface, according to one embodiment. FIG. 3B is a flowchart of a process 320 for displaying relative motion of objects on a graphical user interface using user input, relative mass values of the objects, and a return spring function, according to one embodiment. In one embodiment, the user interface widget (e.g., 103A, 109A ... 109N, and/or 111) performs the processes 300 and 320, and is implemented in, for instance, a chip set including a processor and a memory as shown FIG. 7. FIGS. 4 and 5A-5C are diagrams of graphical user interfaces depicting the processes of FIGS. 3A and 3B, according to various embodiments.

Figure 4:
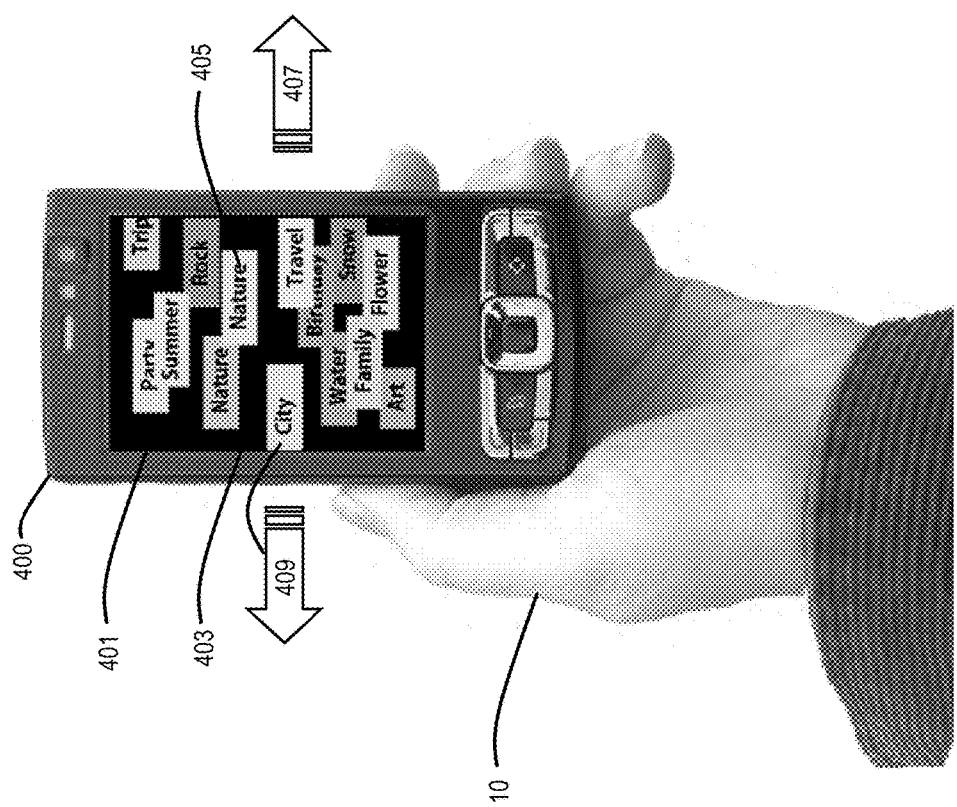
FIG. 4 is a diagram of an apparatus having a graphical user interface, according to various embodiments.

In step 301 of the process 300 for displaying relative motion of objects on a fluid graphical user interface, various objects are caused to be displayed on a GUI, where the objects correspond to data or application(s) accessible via the GUI. In step 303, the objects are caused to be displayed in motion based on user input and respective relative mass values associated with the objects. Thus, as shown in FIG. 4, an apparatus 400, such as a mobile telecommunications device, includes a display 401 on which a graphical user interface 403 is displayed that includes various objects 405. When a user 10 moves the apparatus 400, for example, to from left-to-right as shown by arrow 407, then this motion is sensed as user input by a motion sensor on the apparatus 400, and this user input and respective relative mass values associated with the objects are used to display the objects 405 in motion on the GUI 403. For example, the rightward motion shown by arrow 407 will cause the objects 405 to initially move in a leftward direction on the GUI 403 as shown by arrow 409, and the relative mass values of the objects will determine the distance, speed, and other movement factors of each object in much the same manner as if the objects were real objects floating within a viscous fluid on the GUI. Then, following the leftward motion of the objects 405, the objects 405 would be returned to their initial position by a spring function that moves the objects rightward back to the initial position, absent any further user input.

In step 321 of the process 320 shown in FIG. 3B, a user is allowed to move the apparatus on which the GUI is displayed in a first direction to provide the user input. Thus, as shown in the embodiment in FIG. 4, the user 10 moves the apparatus 400 in a rightward direction of arrow 407. In step 323, the objects are caused to be displayed in motion away from an initial rest position in a second direction opposite to the first direction based on the user input and respective relative mass values of the objects. Thus, as shown in FIG. 4, the objects 405 will move in a leftward direction as shown by arrow 409. In step 325, the objects are caused to be displayed in motion back toward the rest position in the first direction based on a return spring function and respective mass values of the objects. A further embodiment of this motion is shown in FIGS. 5A-5C, as will be described in detail below.

The motion of the objects can be limited to motion along an axis (e.g., left-and-right motion, upward-and-downward motion, etc.) or it can allow motion in all directions. Additionally, the motion of the objects can be limited to motion within a single plane, parallel planes, or in three-dimensional space. The motion sensor of the apparatus 400 can sense the user input in any direction, and apply the appropriate return spring function in a direction opposite to the motion sensed. If the motion is restricted to a given axis or plane, then the motion sensor can sense motion in that direction and/or along that plane, and utilize those vectors to determine the motion and return motion based on the return spring function in conjunction with the relative mass values.

As can be seen in FIG. 4, the objects can be shown within various parallel planes within the GUI 403, where certain objects are shown further in the foreground than others. The objects can overlap with one another, and can be opaque or transparent. In various embodiments, the objects movement in response to the user input can be within their respective plane in a parallel manner. The movement within such parallel planes can be limited to movement in parallel to a given axis or it can allow motion in all directions within their respective planes. The depth of the objects within the virtual environment of the GUI can be determined by relevancy factors, as will be discussed in greater detail below. The depth of each object can be determined based on the same relevancy factors upon which the relative mass values of the objects are based, or based on different relevancy factors.

Figure 5A:
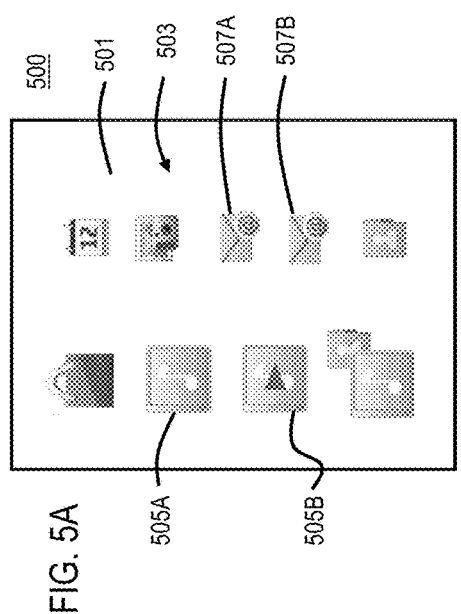
FIGS. 5A-5C are diagrams of graphical user interfaces depicting the processes of FIGS. 3A and 3B, according to various embodiments.
Figure 5C:
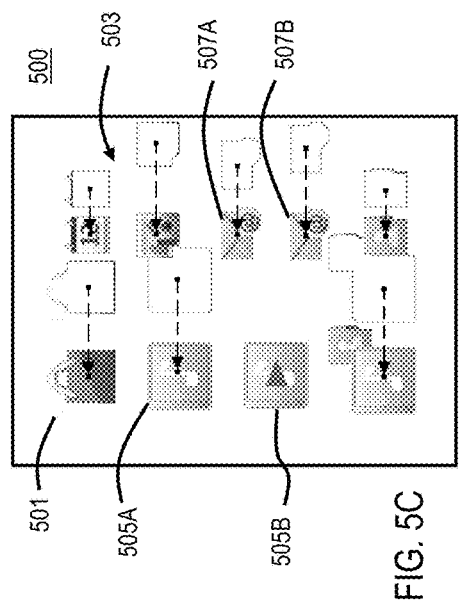
Figure 5B:
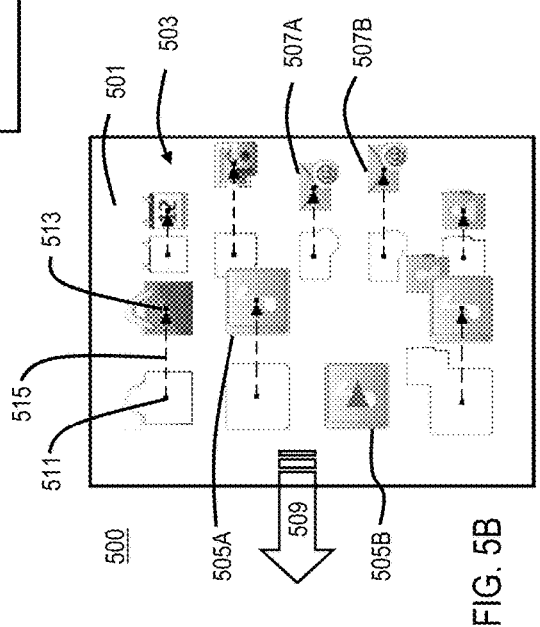

FIGS. 5A-5C are diagrams of graphical user interfaces depicting the processes of FIGS. 3A and 3B, according to various embodiments. FIG. 5A depicts a GUI 500 that includes a display area 501 in which a plurality of objects 503 are shown. The embodiment shown FIG. 5A includes, for example, a first music file 505A, a second music file 505B, a first message 507A, and a second message 507B. In this embodiment, the second music file 505B is shown in a playback mode, as indicated by the sideways triangle overlaid on the icon thereof. The depiction in FIG. 5A shows the objects 503 in a rest state, such that they are located in their respective initial rest positions.

The objects 503 are depicted in FIG. 5A in generic form (e.g., as shopping bag(s), calendar(s), music file(s), picture/video file(s), message(s), linked files, contact(s), etc.), but can also be displayed as specific items (e.g., a specific store link or shopping bag, a specific calendar or calendar entry, a specific album/song/artist/genre, a specific picture/video or picture/video album, specific message inbox or specific message, specific linked/grouped items, specific contact folder or specific contact entry, etc.) that can be shown as fixed or animated icons that can include descriptive information and/or web links. While the GUI 500 shown in FIGS. 5A-5C includes objects of different types, the GUI could also be used to display objects of the same type or in the same group. The objects can be shown in a random or arranged manner on the GUI when in their rest positions. Also, in various embodiments, the rest position of the objects can be altered, for example, by the user dragging or moving the objects at rest to a new rest position, if desired. Additionally, the GUI can be configured such that the user can fix or pin the location of one or more objects to a particular location on the GUI, such that the object(s) does not move upon motion input by the user. Also, the GUI could be configured to show information related to such pinned and/or non-pinned objects in response to movement or shaking of the mobile device.

FIG. 5B depicts the GUI 500 at a moment at which the user provides user input by moving the apparatus on which the GUI 500 is displayed in a leftward (i.e., right-to-left) direction, as shown by arrow 509. In response to the leftward movement by the user, the objects 503 move in a rightward (i.e., left-to-right) direction based on the user input and their relative mass values. Thus, as can be seen in FIG. 5B, a shopping bag object moves from an initial rest portion 511 to a second position 513, and thereby travels a distance 515. The distance traveled by each object will depend not only on the user input, but also on the relative mass value of the object. Therefore, as can be seen by comparing the movements of the first message 507A and the second message 507B, the second message 507B travels further than the first message 507A due to a difference in relative mass values of these objects. Also, notably, the second music file 505B does not move in response to the user input, since this object has been pinned to its rest position, for example, based on action of the user to pin it down, or the fact that the second music file is in playback mode, etc.

After the objects reach their respective second positions as shown in FIG. 5B, then the objects will move back towards their initial rest positions (absent any additional user input) as shown in FIG. 5C under force of a virtual return spring function. Thus, the objects can be considered as being attached to their respective rest positions by a virtual spring that acts to return the object to the rest position in a direction opposite to any input force provided by the user.

As noted above, the movement of the objects is not only dependent upon the user input motion, but also relative mass values associated with the objects, as well as predefined return spring function and overall physics modeling used to construct the virtual environment of the GUI. For example, the virtual environment can be modeled such that objects are moving within a viscous fluid. The virtual environment can be modeled such that the physics of the environment replicate real-world movements that the user can easily relate to, or could be modeled to provide movements that deviate from real-world movements if so desired.

Thus, objects having higher relative mass values will react to the user input motion differently than objects having smaller relative mass values. The relative mass values associated with the objects effect the motion of the respective objects by varying at least one of a distance travelled by the respective objects in response to the user input, a speed at which the respective objects travel in response to the user input, and a time period during which the respective objects travel in response to the user input. For example, an object having a higher relative mass value might travel a shorter distance than an object having a lower relative mass value, depending on the physics modeling used to construct the virtual environment. Alternatively, the GUI could be configured such that objects that are provided with low relative mass values could be removed from the GUI display by shaking or moving the apparatus with a certain threshold level of force. Thus, the user could shake away low importance objects.

The relative mass values assigned to the objects can be based on various relevancy factors or other criteria. For example, the relative mass values of the objects can be based on data size of the objects, frequency of use of the objects, ratings of the objects (e.g., ratings set by the user, ratings set by a website/organization, etc.), rankings of the objects (e.g., rankings set by the user, rankings set by a website/organization, etc.), and/or contextual data related to the objects. Thus, for example, a first music file that is more frequently listened to by the user could be assigned a higher relative mass value than a second music file, and therefore the first music file would move a shorter distance than the second music file in response to a given user input motion. Also, for example, the first music file having the higher relative mass value might also be shown to move in a plane that is further in the foreground of the GUI as compared to a plane in which the second music file is shown to move. Another embodiment could show objects that relate to links to bids the user placed on items on an auction website, where, for example, recent bids/counterbids are shown in the foreground and older bids/counterbids are shown in the background. By assigning such relative mass values to objects, the GUI can more prominently display certain important objects, as compared to other objects.

Thus, various embodiments can provide parallax movement of information layers by shaking phone. Thus, a method is provided for distinguishing important elements on a display of a mobile device from the relatively less important ones. The mobile device includes a motion sensor, such as an accelerometer. When a change in the motion of the device is detected by the motion sensor, objects or items on the display move in an opposite direction. When movement stops, the objects slide back their original positions. The amplitude of movement can depend on the item's importance (e.g., based on factors such as relevancy, popularity, or any context aware information like distance or novelty).

Various embodiments of the graphical user interface can be used with a wide variety of objects/items. For example, the objects could be textual data within a message, where the textual data is tagged in a manner similar to tag clouds, such that the tagged objects provide dynamic links to further information on the textual data. Such tag clouds could be treated as objects having a relative mass value, such that user input motion moves the tag clouds in the manner discussed above, thus making such tag clouds more distinguishable and providing a interactive or "playful" GUI display. Small screens of mobile devices have finite space on their screens, and lighting conditions are sometimes difficult. Together, these factors make it difficult to visualize multiple items on the same screen, as in typical tag cloud environments, which may include dozens of items that may be displayed in various sizes and colors. However, changing the size of the font wastes screen space and colors are also sometimes more difficult to identify in mobile screens. Thus, the embodiments including tag clouds shown as objects having relative mass values provides a compact, intuitive, and enjoyable GUI that clearly emphasize certain tags over others.

In other embodiments, the objects could be point of interest (POI) locations/items/information provided in an augmented reality setting. Such POI objects can be assigned relative mass values (e.g., customer reviews of restaurants, price ranking of restaurants, etc.), and thus a user would be able to quickly and easily assess information associated with the POI objects.

In various embodiments, a motion sensor is provided in a mobile device, which gives information of move direction, speed, and acceleration. Every item in a tag cloud can react to the movement with different intensity. This effectively creates a layered depth effect, which gives users a better visual grasp of the tag cloud. A further way towards more natural interaction is to model the objects as virtual objects with inertia, for example, such that more important objects react more slowly to device movements than less important objects. Thus, accelerometer information can be used to distinguish certain objects from other ones. In various embodiments, when the mobile device detects a change in its movement, objects on the display screen are moved in the opposite direction. When movement ceases to change, then the objects slide back to their original rest positions. The strength or amplitude of movement can be dependent upon the object's importance, which can be a function of, for example, relevancy, popularity, or any context aware information like distance or novelty.

In various embodiments, a more natural interaction is presented to the user by modeling the objects as virtual objects that have a physical mass. The "mass" can be a function of the importance of the item. The mass allows an object to have inertia when force is applied such that, for example, heavier objects can be slower to react to movement than lighter objects. Therefore, when the device is moved, the heavier objects lag on the screen, and when the movement is stopped, the heavier objects decelerate more slowly. This forms an intuitive way of showing the objects' relative weights of importance, and is also very natural to humans who are hardwired in their nervous systems to deal with object with inertia. To mimic this weight, in certain embodiments, the font size of the items could grow in proportion with their mass. Further realism can be achieved by placing the items in a virtual fluid. The viscosity of the virtual fluid could slow down the objects' response to movement. After the device movement, the objects can be returned to their original positions by being dragged with virtual springs that are attached to those original positions. Together, these physical effects (i.e., acceleration, mass, inertia, springs, viscosity) simulate a "real-world" fluid box with tags floating in it. This GUI environment should feel intuitive, "real", interesting and delightful to many users.

In various embodiments, the objects, such as cloud tag objects, can partly overlap each other. If the objects are made partially transparent, then their relative movements may be easier to perceive in such an overlapping configuration.

The GUI advantageously provides a "floating effect" to the objects, which increases the entertainment value of application. The "fun factor" is a major advantage in today's marketplace.

An overlapping configuration or configuration in which size variations are used for objects, the impression of a depth effect is advantageously stronger or more accentuated.

A user can quickly identify overlapped, less important objects, as compared to more important objects in the foreground simply by shaking or moving the mobile device.

Various embodiments of the GUI can be used for any screen arrangements where several objects must be displayed, not only tag clouds.

The processes described herein for displaying relative motion of objects on a graphical user interface may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
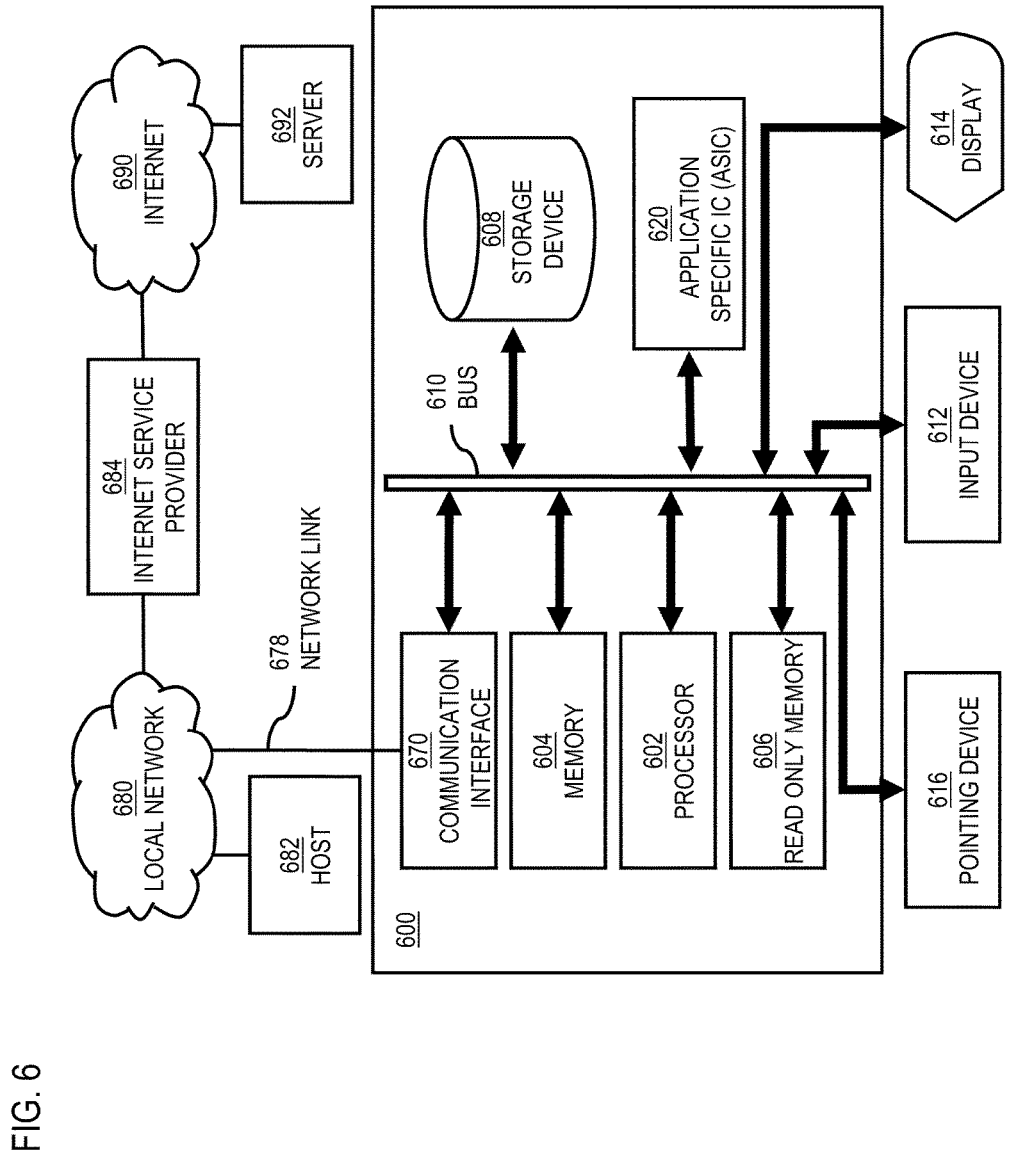
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to display relative motion of objects on a graphical user interface as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of displaying relative motion of objects on a graphical user interface.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to displaying relative motion of objects on a graphical user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for displaying relative motion of objects on a graphical user interface. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for displaying relative motion of objects on a graphical user interface, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for displaying relative motion of objects on a graphical user interface to the UEs 101A . . . 101N, and/or 103.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
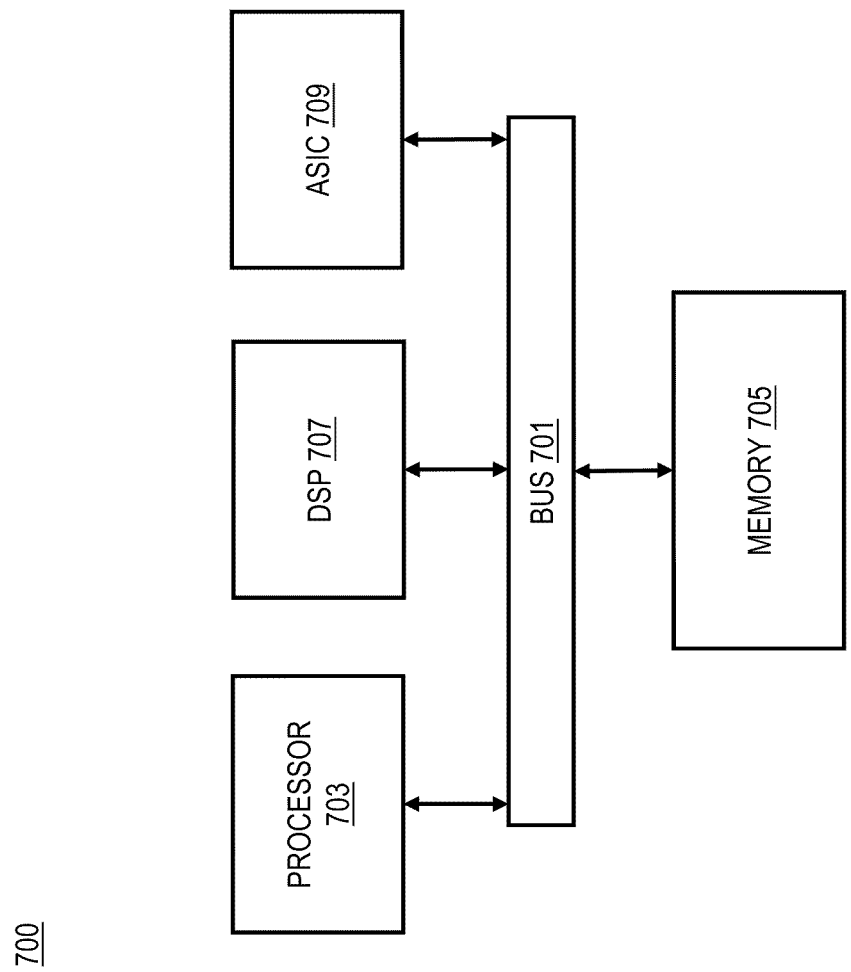
FIG. 7 is a diagram of a chip set that can be used to implement an embodiment of the invention.

FIG. 7 illustrates a chip set or chip 700 upon which an embodiment of the invention may be implemented. Chip set 700 is programmed to display relative motion of objects on a graphical user interface as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of services. Chip set or chip 700, or a portion thereof, constitutes a means for performing one or more steps of displaying relative motion of objects on a graphical user interface.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to display relative motion of objects on a graphical user interface. The memory 705 also stores the data associated with or generated by the execution of the inventive steps.

Figure 8:
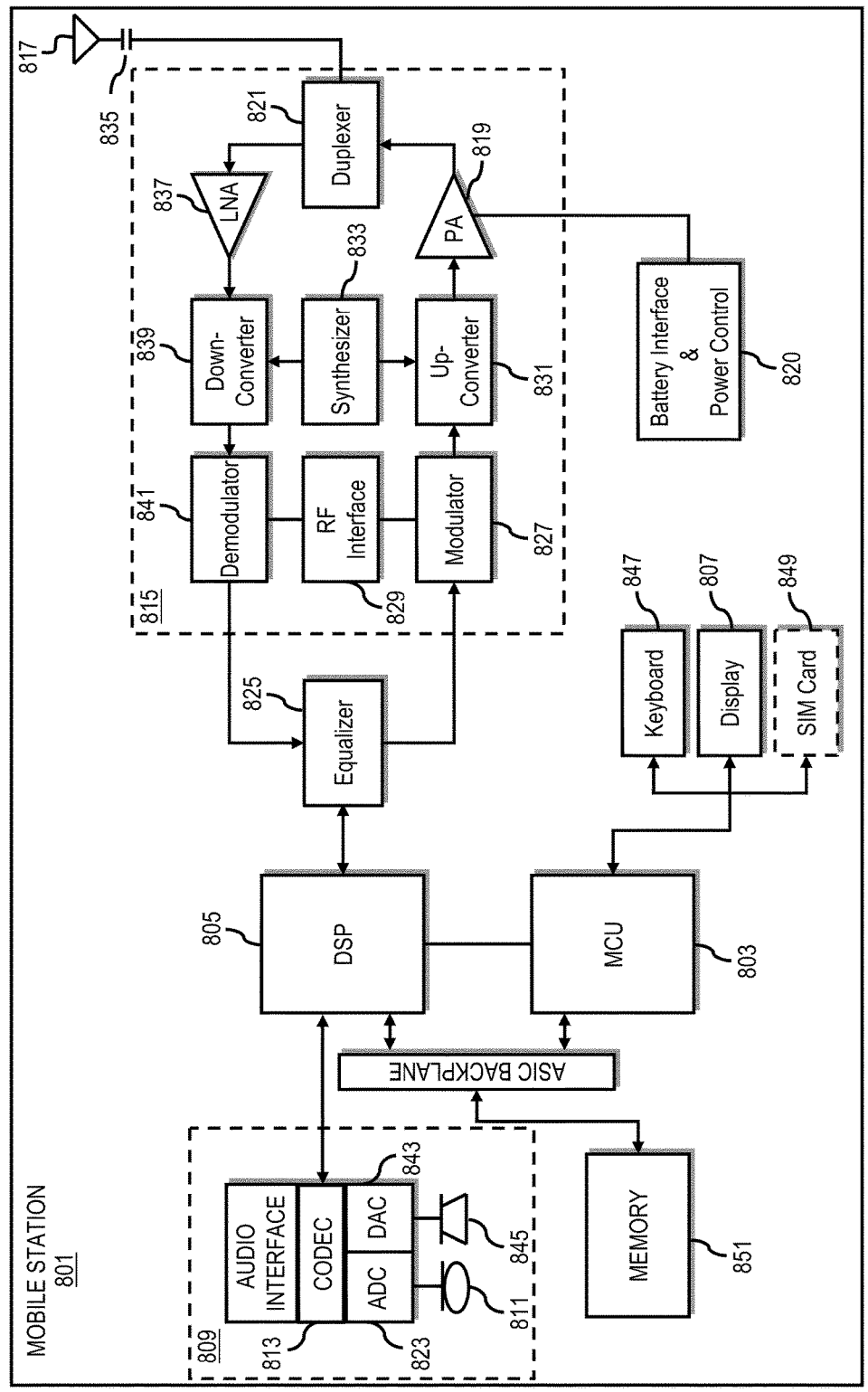
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile station or terminal 801, or a portion thereof, constitutes a means for performing one or more steps of displaying relative motion of objects on a graphical user interface. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of displaying relative motion of objects on a graphical user interface. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to display relative motion of objects on a graphical user interface. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    causing, at least in part, display of at least a first object at rest in a first rest position and a second object at rest in a second rest position on a graphical user interface provided by an apparatus, wherein each of the first and second objects corresponds to data or an application accessible via the graphical user interface;
    causing sensing of a user input comprising movement of the apparatus by a motion sensor of the apparatus; and
    causing, at least in part, display of at least the first and second objects moving away from the first and second rest positions on the graphical user interface based on the user input and based on a first relative mass value associated with the first object and a second relative mass value associated with the second object that is different from the first relative mass value, and display of movement of at least the first object back to the first rest position and the second object back to the second rest position based on a return spring function and based on the first and second relative mass values associated with the first and second objects,
    wherein the first relative mass value is higher than the second relative mass value and the first object is caused to be displayed within a virtual plane that is further in the foreground of the graphical user interface than the second object having the second, lower, relative mass value.

2. The method of claim 1, wherein, when the user input includes movement of the apparatus in a first direction, then the first and second objects are initially caused to be displayed in motion travelling away from the first and second rest positions in a second direction opposite to the first direction, and then the first and second objects are caused to be displayed in motion travelling back to the first and second rest positions in the first direction.

3. The method of claim 1, wherein the first and second relative mass values associated with the first and second objects affect the motion of the first and second objects by varying at least one of a distance travelled by the first and second objects in response to the user input, a speed at which the first and second objects travel in response to the user input, and a time period during which the first and second objects travel in response to the user input.

4. The method of claim 1, wherein the first and second relative mass values of the first and second objects are based on data size of the first and second objects, frequency of use of the first and second objects, ratings of the first and second objects, rankings of the first and second objects, and/or contextual data related to the first and second objects.

5. The method of claim 1, wherein:
    at least the first and second objects are caused to be displayed in motion along a plurality of parallel virtual planes within the graphical user interface; and
    respective planes of the plurality of parallel virtual planes in which the first and second objects are caused to be displayed are determined based on the first and second relative mass values of the first and second objects.

6. An apparatus comprising:
    at least one processor; and
    at least one memory including computer program code,
    the at least one memory and the computer program code configured to, with the at least one processor, cause the apparatus to perform at least the following:
    causing, at least in part, display of at least a first object at rest in a first rest position and a second object at rest in a second rest position on a graphical user interface, wherein each of the first and second objects corresponds to data or an application accessible via the graphical user interface;

causing sensing of a user input by a motion sensor of the apparatus;

causing, at least in part, display of at least the first and second objects moving away from the first and second rest positions on the graphical user interface based on the user input and based on a first relative mass value associated with the first object and a second relative mass value associated with the second object that is different from the first relative mass value, and display of movement of at least the first object back to the first rest position and the second object back to the second rest position based on a return spring function and based on the first and second relative mass values associated with the first and second objects, wherein the first relative mass value is higher than the second relative mass value and the first object is caused to be displayed within a virtual plane that is further in the foreground of the graphical user interface than the second object having the second, lower, relative mass value.

7. The apparatus of claim 6, wherein, when the user input includes movement of the apparatus in a first direction, then the first and second objects are initially caused to be displayed in motion travelling away from the first and second rest positions in a second direction opposite to the first direction, and then the first and second objects are caused to be displayed in motion travelling back to the first and second rest positions in the first direction.

8. The apparatus of claim 6, wherein the first and second relative mass values associated with the first and second objects affect the motion of the first and second objects by varying at least one of a distance travelled by the first and second objects in response to the user input, a speed at which the first and second objects travel in response to the user input, and a time period during which the first and second objects travel in response to the user input.

9. The apparatus of claim 6, wherein the first and second relative mass values of the first and second objects are based on data size of the first and second objects, frequency of use of the first and second objects, ratings of the first and second objects, rankings of the first and second objects, and/or contextual data related to the first and second objects.

10. The apparatus of claim 6, wherein:
at least the first and second objects are caused to be displayed in motion along a plurality of parallel virtual planes within the graphical user interface; and
respective planes of the plurality of parallel virtual planes in which the first and second objects are caused to be displayed are determined based on the first and second relative mass values of the first and second objects.

11. A non-transitory computer-readable storage medium carrying one or more sequences of one or more instructions which, when executed by one or more processors, cause an apparatus to at least perform:
causing, at least in part, display of at least a first object at rest in a first rest position and a second object at rest in a second rest position on a graphical user interface provided by the apparatus, wherein each of the first and second objects corresponds to data or an application accessible via the graphical user interface;

causing sensing of a user input comprising movement of the apparatus by a motion sensor of the apparatus; and causing, at least in part, display of at least the first and second objects moving away from the first and second rest positions on the graphical user interface based on the user input and based on a first relative mass value associated with the first object and a second relative mass value associated with the second object that is different from the first relative mass value, and display of movement of at least the first object back to the first rest position and the second object back to the second rest position based on a return spring function and based on the first and second relative mass values associated with the first and second objects, wherein the first relative mass value is higher than the second relative mass value and the first object is caused to be displayed within a virtual plane that is further in the foreground of the graphical user interface than the second object having the second, lower, relative mass value.

12. The non-transitory computer-readable storage medium of claim 11, wherein, when the user input includes movement of the apparatus in a first direction, then the first and second objects are initially caused to be displayed in motion travelling away from the first and second rest positions in a second direction opposite to the first direction, and then the first and second objects are caused to be displayed in motion travelling back to the first and second rest positions in the first direction.

13. The non-transitory computer-readable storage medium of claim 11, wherein the first and second relative mass values associated with the first and second objects affect the motion of the first and second objects by varying at least one of a distance travelled by the first and second objects in response to the user input, a speed at which the first and second objects travel in response to the user input, and a time period during which the first and second objects travel in response to the user input.

14. The non-transitory computer-readable storage medium of claim 11, wherein the first and second relative mass values of the first and second objects are based on data size of the first and second objects, frequency of use of the first and second objects, ratings of the first and second objects, rankings of the first and second objects, and/or contextual data related to the first and second objects.

15. The non-transitory computer-readable storage medium of claim 11, wherein:
at least the first and second objects are caused to be displayed in motion along a plurality of parallel virtual planes within the graphical user interface;
respective planes of the plurality of parallel virtual planes in which the first and second objects are caused to be displayed are determined based on the first and second relative mass values of the first and second objects.

16. The method of claim 1, wherein the first and second objects are points of interest and the first and second relative masses are assigned, at least in part, on their popularity.

17. The method of claim 1, wherein the user input has directionality, and following display of the first and second objects moving away from the first and second rest positions, the first and second objects are displayed returning back to the first and second rest positions irrespective of the directionality of the user input.

* * * * *